United States Patent
Cooper

(10) Patent No.: US 7,016,537 B2
(45) Date of Patent: Mar. 21, 2006

(54) VEHICLE OCCUPANT SENSOR APPARATUS AND METHOD INCLUDING SCANNED, PHASED BEAM TRANSMISSION FOR OCCUPANT CHARACTERISTIC DETERMINATION

(75) Inventor: Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 870 days.

(21) Appl. No.: 09/897,377

(22) Filed: Jul. 2, 2001

(65) Prior Publication Data

US 2003/0002738 A1    Jan. 2, 2003

(51) Int. Cl.
*G06K 9/48*    (2006.01)

(52) U.S. Cl. .................................................. 382/199

(58) Field of Classification Search ................ 382/100, 382/103, 104, 106, 199, 181, 224; 348/143, 348/148; 280/732–735, 728.1–728.2, 730.1, 280/730.2; 340/436, 438, 443, 447; 180/271, 180/272; 250/221, 224, 222.1, 208.1; 359/208.2, 359/291; 701/45–47; 356/3–4.1, 601–613, 356/622–623

See application file for complete search history.

(56) References Cited

U.S. PATENT DOCUMENTS 5,585,625 A * 12/1996 Spies ......................... 250/221
5,835,613 A    11/1998 Breed et al. ................. 382/100
5,845,000 A    12/1998 Breed et al. ................. 382/100
5,848,802 A *  12/1998 Breed et al. ................. 280/735
5,983,147 A *  11/1999 Krumm ........................ 701/45
6,099,030 A *   8/2000 Kraft ........................... 280/735
6,137,623 A *  10/2000 Roberson et al. ............ 359/291
6,236,035 B1 *  5/2001 Saar et al. .................... 250/221
6,480,616 B1 * 11/2002 Hata et al. .................... 382/106

OTHER PUBLICATIONS

Fritzscheet al. Vehicle occupancy monitoring with optical range-sensors, IEEE 0-7803-8310-9/04, 90-943*
Fritzsche et al., Vehicle occupancy monitoring with optical range-sensors, IEEE 0-7803-8310-9/04, 90-94.*

* cited by examiner

*Primary Examiner*—Joe Mancuso
*Assistant Examiner*—Ishrat Sherali
(74) *Attorney, Agent, or Firm*—Tarolli, Sundheim, Covell & Tummino L.L.P.

(57) ABSTRACT

An apparatus (34) and associated method are provided for vehicle occupant sensing. An EM energy driver component (36) and associated EM energy source (40) provide a modulated beam (44, e.g., IR light), and a movable reflection component (46) scans the beam onto an occupant location. A detector (92) detects beam reflection and a phase determination component (96) processes phase information that is provided to a controller (24). Within the controller (24) processing (114, 116, and 118) provides mapping of occupant contours and determination of an occupant characteristic.

9 Claims, 3 Drawing Sheets

VEHICLE OCCUPANT SENSOR APPARATUS AND METHOD INCLUDING SCANNED, PHASED BEAM TRANSMISSION FOR OCCUPANT CHARACTERISTIC DETERMINATION

TECHNICAL FIELD

The present invention is directed to an occupant sensor apparatus for use in a vehicle occupant protection system or the like, and is particularly directed to an occupant sensor apparatus that maps distance to an occupant over a scanned area to determine an occupant characteristic.

BACKGROUND OF THE INVENTION

Occupant protection systems for use in vehicles are known in the art. One type of protection system includes an actuatable inflatable protection module, which has an inflatable component that is commonly referred to as an air bag. A controller determines whether the protection module is to be actuated to inflate the air bag within a vehicle passenger compartment. The protection module is actuated by the controller upon the occurrence of a predetermined vehicle condition for which a vehicle occupant is to be protected. For example, when a sensor senses a vehicle condition indicative of a deployment collision condition, the protection module is actuated.

In certain circumstances, even if the predetermined deployment condition occurs, the protection system refrains from actuating the protection module (i.e., the air bag is not inflated). For example, if an occupant seated in a vehicle seat associated with the restraint module is located in a position such that actuating the protection module and deploying the air bag will not enhance protection of the occupant, actuation of the protection module does not occur. An occupant who is very near the protection module is referred to as being within an occupant out-of-position zone. Deploying an air bag for an occupant who is within an occupant out-of-position zone will not enhance protection of the occupant.

In another example, it is typically not desirable to actuate a protection module (i.e., inflate an air bag) when an occupant associated with the location of the restraint module is a child in a child seat. This is typically due to the fact that actuation of the restraint module will not enhance protection for the child. In yet another example, it is typically not desirable to actuate a protection module when an occupant does not occupy the seat associated with the protection module. An actuated protection module typically requires costly servicing/replacement. Thus, actuation of a protection module when an occupant is absent is economically wasteful. In sum, controlling actuation (e.g., abstaining from deployment) based upon one or more occupant characteristics provides certain benefits.

A protection module may have one or more adjustable aspects, and in order to enhance performance of the protection module, the adjustable aspect(s) are adjusted. In the example protection module that contains a deployable air bag, a deployment dynamic profile of the air bag is adjustable. Specifically, the inflation timing, inflation pressure, the rate of inflation, and the positioning of the inflated air bag are all potential adjustable aspects. The adjustment of the protection module is responsive one or more occupant characteristics.

Occupant characteristics are determined via sensory operations. Accordingly, sensory information regarding the occupant plays an important role in the control of protection devices.

SUMMARY OF THE INVENTION

In accordance with one aspect, the present invention provides a vehicle occupant sensor apparatus. The apparatus includes means for modulating a scanned occupant beam, means for mapping occupant contours in response to the modulated beam, and means for determining an occupant characteristic in response to the mapped contours.

In accordance with another aspect of the present invention, beam means emits a beam. Modulation means modulates the beam. Scan means directs the beam toward the occupant in a pattern that moves across a plurality of points of the occupant. Receiver means receives reflection of the beam from the occupant. Phase determination means determines phase difference between the emitted beam and the reflection associated with each point on the occupant. Map means maps a contour and location representation of the occupant using the determined phase differences. Characteristic determination means determines at least one occupant characteristic of the occupant using the contour and location representation of the occupant.

In accordance with another aspect, the present invention provides a method of vehicle occupant sensing. The method includes modulating a scanned occupant beam, mapping occupant contours in response to the modulated beam, and determining an occupant characteristic in response to the mapped contours.

In accordance with yet aspect of the present invention, a beam is emitted. The beam is modulated. The beam is directed toward the occupant in a pattern that moves across a plurality of points on the occupant. Reflection of the beam from the occupant is received. Phase difference between the emitted beam and the reflection associated with each point on the occupant is determined. A contour and location representation of the occupant is determined using the determined phase differences. At least one occupant characteristic of the occupant is determined using the contour and location representation of the occupant.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
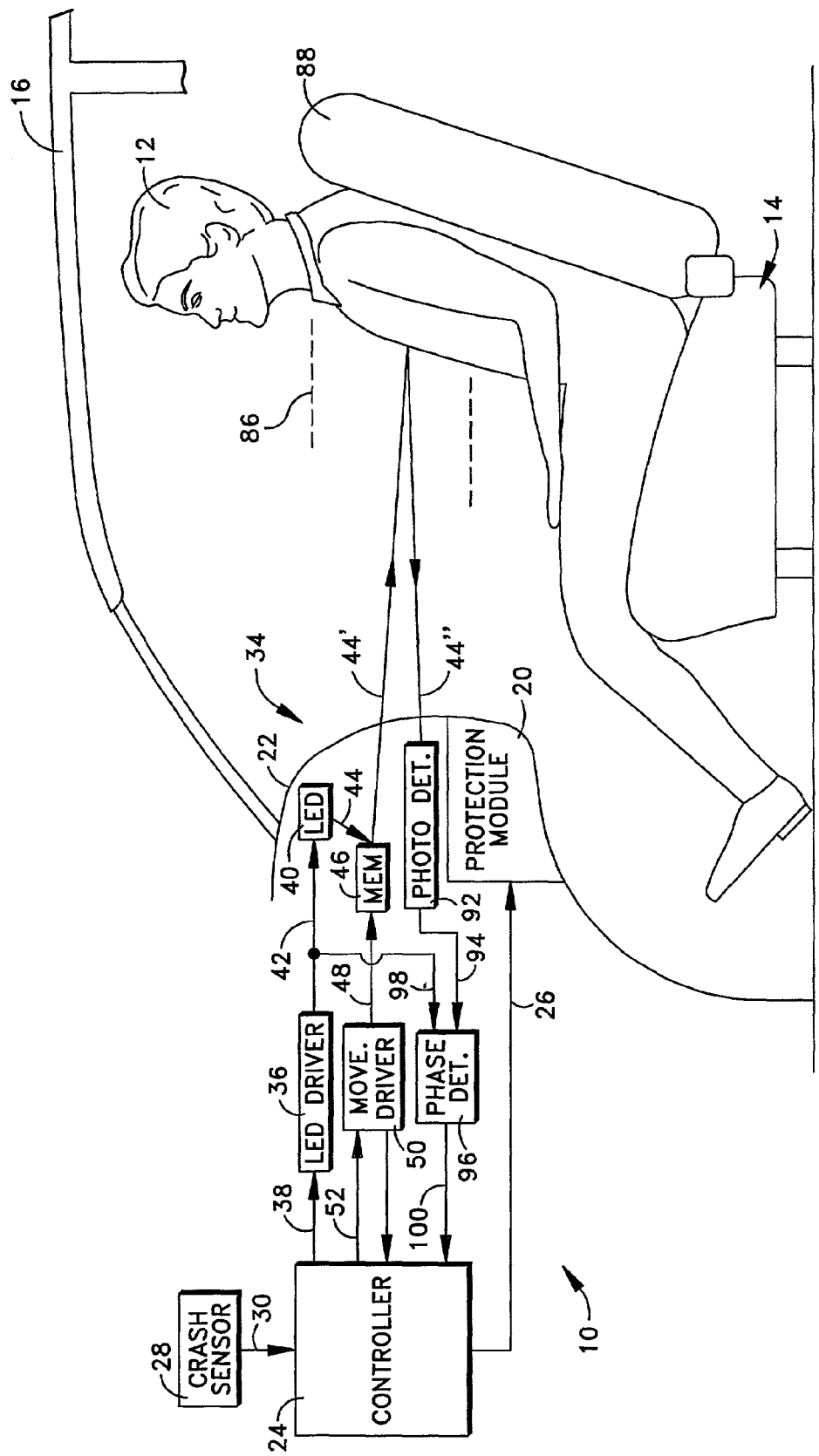
FIG. 1 is a schematic illustration of a portion of a vehicle that contains an occupant protection system that includes an occupant sensor apparatus in accordance with the present invention.

An occupant protection system 10 is schematically illustrated in FIG. 1. The system 10 is provided for an occupant 12 seated on a vehicle seat 14 within a vehicle 16. The system 10 includes an actuatable occupant protection device 20 that is provided as a module. The protection module 20 is associated with the vehicle seat 14 and thus an occupant seating location provided by the seat. In one example embodiment, the protection module 20 includes an inflatable component, commonly referred to as an air bag. The air bag is inflatable within an occupant compartment of the vehicle. In the illustrated example, the protection module 20 is located within a dashboard or instrument panel 22 of the vehicle 16 and the vehicle seat 14 is a front passenger seat.

It is to be appreciated that the specific type and the location of protection device are not limitations on the present invention. In other words, features of the protection device may be changed without departing from the present invention. For example, another type of protection device (e.g., a driver side protection module or a side curtain module) may be provided in the system and/or the protection device may be located elsewhere within the vehicle (e.g., on the steering wheel). The system may include a protection device that does not have an inflatable component, such as an actuatable knee bolster or a seat belt system with an actuatable portion (e.g., a pretensioner). Also, it will be appreciated that the system may include a plurality of actuatable protection devices.

In one example, the protection module 20 may also have at least one adjustable aspect. For example, the deployment of the air bag is adjusted. Examples of an air bag deployment adjustment includes adjustment of inflation timing, adjustment of inflation pressure, adjustment of location of the inflated air bag relative to the occupant, and adjustment of the dynamic profile of the air bag during inflation.

A specific example of adjustment to inflation timing is selection of a time period between a determination to actuate the protection module and an initiation of the air bag inflation. A specific example of adjustment of inflation pressure is control of a pressure relief valve that vents the air bag. Dynamic profile control is accomplished by directing inflation fluid into the air bag in predetermined zones within the air bag or by control of the number and timing of a plurality of inflation sources and vent valves during inflation.

A specific example of adjustment of air bag positioning is control of positioning motors operative to move the air bag housing. Another specific example of adjustment of air bag positioning is moving the entire protection module toward or away from the occupant and/or moving the occupant toward or away from the protection module.

Control of the protection module 20, to adjust any adjustable aspect(s) and to cause actuation of the protection module is by a controller 24 that is operatively connected 26 to provide control signals to the protection module. In one example, the controller 24 is a microcomputer. The controller 24 receives sensory input from several sources and, using the sensory input, makes determinations regarding protection module control.

One of the sensory input sources for the controller 24 is a sensor 28 that senses a vehicle condition for which an occupant is to be protected, and that is operatively connected 30 to provide a signal to the controller indicative of the sensed vehicle condition. In one example, which is illustrated in the Figures, the sensor 28 is a crash sensor that senses a condition that is indicative of a vehicle crash. Preferably, the crash sensor 28 is an accelerometer, and the signal is an electric signal that has a voltage value indicative of the sensed acceleration and/or a frequency value indicative of the sensed acceleration. In another example, the sensor 28 senses a condition indicative of a vehicle rollover.

It should be appreciated by a person of ordinary skill in the art that the system 10 could have a plurality of sensors providing signals to the controller 24 that are indicative of vehicle conditions for which the occupant is to be protected. Hereinafter, only the single crash sensor 28 and its crash indicative signal are discussed.

An occupant sensor apparatus 34 in accordance with the present invention provides another sensory input for the controller 24. In the illustrated example, at least some a portion of the sensor apparatus 34 is mounted in the instrument panel 22 near the protection module 20. However, it will be appreciated upon further reading it will be understood that other locations for the sensor apparatus 34 are possible.

The sensor apparatus 34 includes an electromagnetic (EM) energy driver component 36 that is operatively connected 38 to the controller 24. An EM energy source 40 is operatively connected 42 to the driver component 36 and is driven by the driver component to emit an EM energy beam 44. In one example, the emitted beam 44 is a light beam, and in particular the light beam is in the infrared portion of the energy spectrum and has a relatively narrow cross-section area. Further in the example, the energy source 40 is an infrared light emitting diode (LED), and the driver component 36 is an LED driver component.

The LED driver component 36 drives the LED 40 to output its infrared light beam 44 at a modulation. In one example, the modulation of the light beam 44 is at a frequency at or near 3 MHz. However, it is to be appreciated that other modulation frequencies are possible.

The LED 40 is positioned to direct its output beam 44 at a movable reflection component 46. The movable reflection component 46 is operatively connected 48 to a movement driver component 50 that causes and controls movement of the reflection component 46. In turn, the movement driver component 50 is operatively connected 52 to the controller 24.

In one example, the reflection component 46 includes a movable reflecting surface that is provided within a MEM (microelectronic machine). A MEM is also known as a micro-machined component and is of a relatively small size (e.g., constructed on the order of a semiconductor technology device). Hereinafter, the reflection component 46 is referred to as a MEM device.

Figure 2:
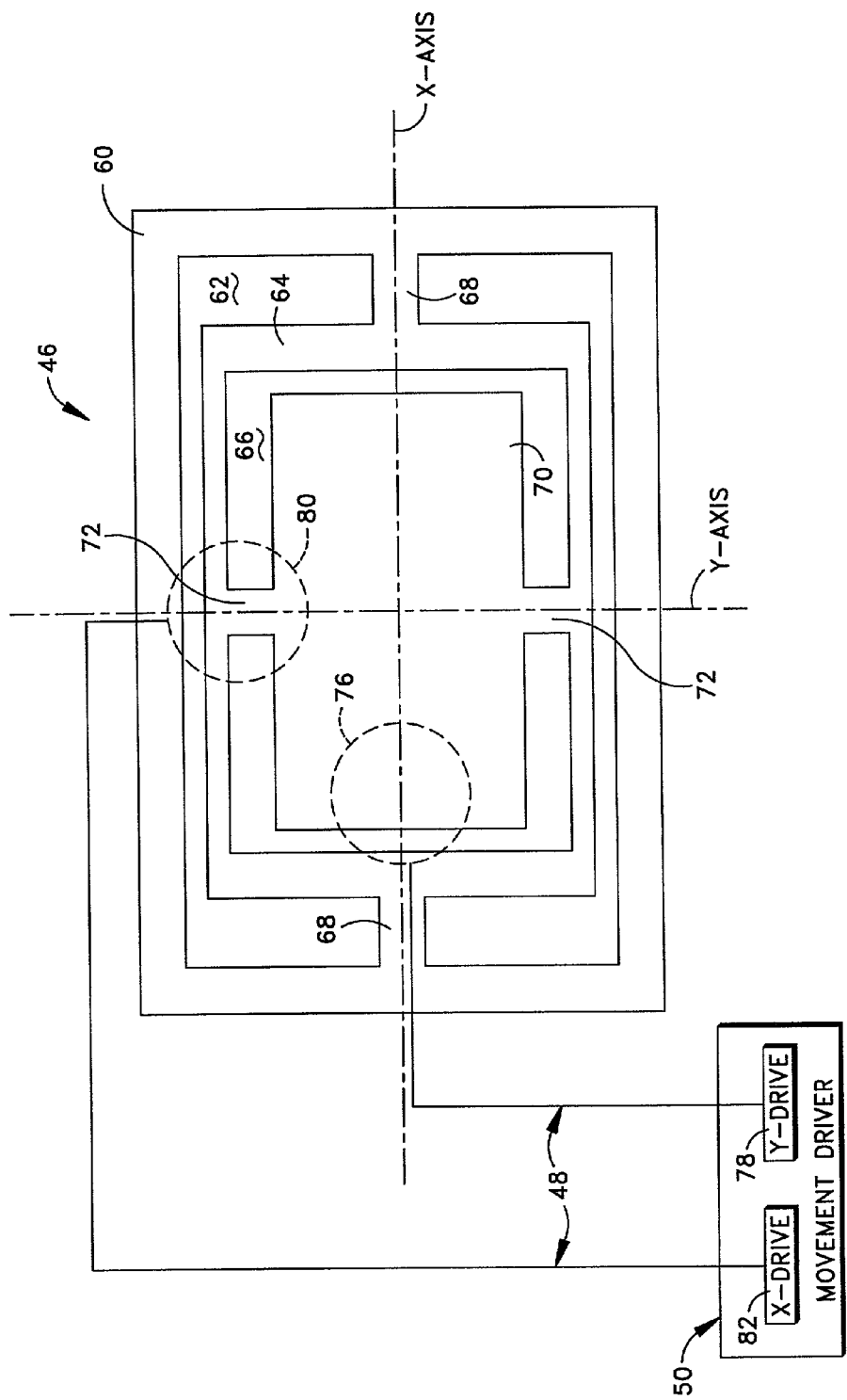
FIG. 2 is an illustration of a scanning reflection component within one embodiment of the occupant sensor apparatus of FIG. 1.

FIG. 2 illustrates one example of the MEM device 46. The device 46 includes an outer frame 60 that is mounted to be motionless relative to the major components of the vehicle (e.g., the vehicle chassis) and associated fixedly mounted components (e.g., the instrument panel 22). The outer frame 60 may have any shape. In the illustrated example, the outer frame 60 has a rectangular shape. The outer frame 60 bounds an area 62 within its extent.

Located within the area 62 bounded by the outer frame 60 is an inner frame 64 that can be thought of as a floating frame. The inner frame 64 can have any shape, and in the illustrated example it has a rectangular shape. Although not essential, the shape of the inner frame 64 mimics the shape of the outer frame 60. The inner frame 64 bounds an area 66.

A pair of connector segments 68 connects the inner frame 64 to the outer frame 60. In the illustrated example, the connector segments 68 extend coaxially along an X-axis. The connector segments 68 are flexible to permit the inner frame 64 to pivot slightly about the X-axis relative to the outer frame 60. The connector segments 68 are resilient and provide a returning force that urges the inner frame 64 toward a neutral position in which the connector segments 68 are not flexed and the outer and inner frames 60 and 64 are generally coplanar. Thus, the connector segments 68 functions similar to torsion springs.

A reflective surface portion 70 has the reflecting surface (e.g., a mirror surface) located thereon to reflect the beam 44. The reflective surface portion 70 is located within the area 66 bounded by the inner frame 64 and thus within the area 62 bounded by the outer frame 60. The reflective surface portion 70 may have any shape. In the illustrated example, reflective surface portion 70 has a rectangular shape. Although not essential, the shape of the reflective surface portion 70 is related to the shape of the inner frame 64.

A pair of connector segments 72 connects the reflective surface portion 70 to the inner frame 64. In the illustrated example, the connector segments 72 extend coaxially and extend perpendicular to the-extent of the connector segments 68 between the outer and inner frames 60 and 64. Thus, in the illustrated example, the connector segments 72 between the inner frame 64 and the reflective surface portion 70 extend along a Y-axis. The connector segments 72 are flexible to permit the reflective surface portion 70 to pivot slightly about the Y-axis relative to the inner frame 64. The connector segments 72 are resilient and provide a returning force that urges the reflective surface portion 70 toward a neutral position in which the connector segments are not flexed, and the inner frame 64 and the reflective surface portion 70 are generally coplanar. Thus, the connector segments 72 functions similar to torsion springs.

The connector segments 72 are generally inflexible about the X-axis. Thus, the reflective surface portion 70 is constrained to pivot with the inner frame 64 about the X-axis. In other words, when the inner frame 64 pivots about the X-axis, the reflective surface portion 70 also moves in a pivot motion about the X-axis. In sum, the reflective surface portion 70 is movable in two (X and Y) pivot directions.

The inner frame 64 and the reflective surface portion 70 have materials that are responsive to electromagnetic stimulation. Electromagnetic stimulation force is used to pivot (move) the inner frame 64 and the reflective surface portion 70.

In order to provide the electromagnetic force to cause pivoting movement of the reflective surface portion 70 about the Y-axis, an electrostatic force component 76 is mounted adjacent to a segment of the reflective surface portion 70 at a location spaced away from the connector segments 72. A Y-drive portion 78 of the movement driver component 50 energizes the electrostatic force component 76 to attract or repel the adjacent material of the reflective surface portion 70.

In order to provide the electromagnetic force to cause pivoting movement of the inner frame/reflective surface portion 64/70 about the X-axis, an electrostatic force component 80 is mounted adjacent to a segment of the inner frame 64 at a location spaced away from the connector segments 68. An X-drive portion 82 of the movement driver component 50 energizes the electrostatic force component 80 to attract or repel the adjacent material of the inner frame/reflective surface portion 64/70.

The pivoting movement of the reflective surface portion 70 on the Y-axis is a back and forth, relatively fast oscillation motion, and the pivoting movement of the inner frame/reflective surface portion 64/70 on the X-axis is a back and forth, relatively fast oscillation motion. As such each of the pivoting movements can be considered as vibrations. In one example, oscillation about the Y-axis is at or near 3,000 Hz and oscillation about the X-axis is at or near 30 Hz. However, it is to be appreciated that other oscillation frequencies are possible.

Returning to the example shown in FIG. 1, the beam 44 that is emitted from the LED 40, impinges upon the MEM device 46, and is directed away (designated 44') from the instrument panel 22 toward the occupant location. The path of the beam 44' away from the MEM device 46 is dependent upon the current condition in the MEM device 46 (e.g., the current orientation or position of the reflective surface portion 70, FIG. 2) caused by the movement driver component 50 (FIG. 1). Further, the path of the beam 44' changes as the condition of the MEM device 46 (orientation or position of the reflective surface portion 70, FIG. 2) changes. The beam 44' is "pointed" or directed at any of a plurality of locations or points within a space area (e.g., two-dimensional) 86 located at a distance from the instrument panel 22. Further, the change in the MEM device 46 (movement of the reflective surface portion 70, FIG. 2) is such that the beam is scanned across the area 86. Hereinafter, the area 86 is referred to as the scanned area 86.

The scanned area 86 is at the occupant seating location. If an occupant/object (e.g., occupant 12) is present on the vehicle seat 14, the scanned area 86 includes at least a portion of the occupant. If the vehicle seat 14 is empty, the scanned area 86 includes at least a portion of a seat back 88. In short, for each scan point, the beam 44' continues until the beam reaches a surface (e.g., a surface of the occupant 12 or the seat back 88).

The beam 44' is reflected from the surface upon which the beam impinges. Specifically, an amount (designated 44") of the beam 44' is reflected back toward the instrument panel 22. It is to be appreciated that the reflection of beam energy 44" need not be a perfect reflection but could merely be a scattering back toward the instrument panel 22. The reflected beam energy 44" still conveys the modulation. Again, it is to be appreciated that the reflection may be from a surface of the occupant 12 (as shown in FIG. 1), a surface of the vehicle seat 14, or from some other surface (e.g., a portion of a child seat that is still considered to be a vehicle occupant to be sensed).

The reflected beam energy 44", or at least the reflected beam energy, is detected by an EM energy receiving device 92. In particular, the EM energy receiving device 92 is a photodetector 92. Further, because the illustrated example deals with infrared energy, the photodetector 92 is an infrared photodetector.

In the illustrated example, the photodetector 92 is mounted in the instrument panel 22, adjacent to the MEM device 46 and protection module 20. It is to be appreciated that the photodetector 92 may be mounted at some other location, as will be appreciated after further reading.

The photodetector 92 is operatively connected 94 to a phase determination component 96. The LED driver component 36 and/or the LED 40 are also operatively connected 98 to the phase determination component 96. The phase determination component 96 operates to detect a phase between the emitted beam 44 and detected beam energy 44". Specifically, phase is born out by difference in the modulation of the emitted and received energy. The determined phase is indicative of the distance between the instrument panel 22, with the sensor apparatus 34, and the surface (e.g., a surface of the occupant 12) from which the beam 44' is reflected.

At this point it is to be appreciated that the MEM device 46 and the photodetector 92 may be mounted at a different location of the vehicle. The distance indication would merely be for a distance between the location of the MEM device photodetector 46 and 92 and the surface from which reflection occurs. For example, if the protection device is a side curtain, locating the MEM device 46 and photodetector 92 to the side of the occupant location would provide useful distance information about lateral location of the occupant, etc. Still further, it is to be appreciated that the MEM device 46 and the photodetector 92 may be spaced at a significant distance from each other. Distance indications are obtained, but simple geometric relationships must be factored into the distance indications. Also, factoring geometric relationships may be needed to relate determined distance indications to another point within the vehicle (e.g., a location of a protection device).

The phase determination component 96 operates at a sensor sample rate such that samples are taken and phase differences are determined as the MEM device 46 scans the beam 44' across the scanned area 86 at the occupant location. In one example, the sampling occurs at a rate of 3,000 samples per second. Accordingly, in the discussed example, this would result in a 100×100 pixel array of samples taken for each vertical frame scanned.

The phase determination component 96 is operatively connected 100 to the controller 24 and the determined phase information is provided from the phase determination component to the controller. The controller 24 utilizes the phase information to make determinations about distance and occupant characteristics indicated by the distances.

Within the controller 24, the plurality of determined distances that comprise the pixel array (e.g., 100×100) and position (e.g., targeting) information from the movement driver component 50 are used to provide a contour map of the scanned area 86. In other words, the distances, and differences between distances, indicate the surface curvature, etc. of the surface from which the beam energy 44" is reflected. From the contour map, determinations about occupant presence, occupant type (e.g., animate person/inanimate object, large/small, adult/child), occupant location (e.g., leaning, tilted), etc. are made. The determinations may be made by any suitable technique, such as recognition and interpretation techniques.

The controller 24 uses the determined information (e.g., distance, occupant characteristics, etc.) to make determinations with regard to control of the protection module 20. This control is in conjunction with control determinations based upon inputs provided by the crash sensor 28.

Figure 3:
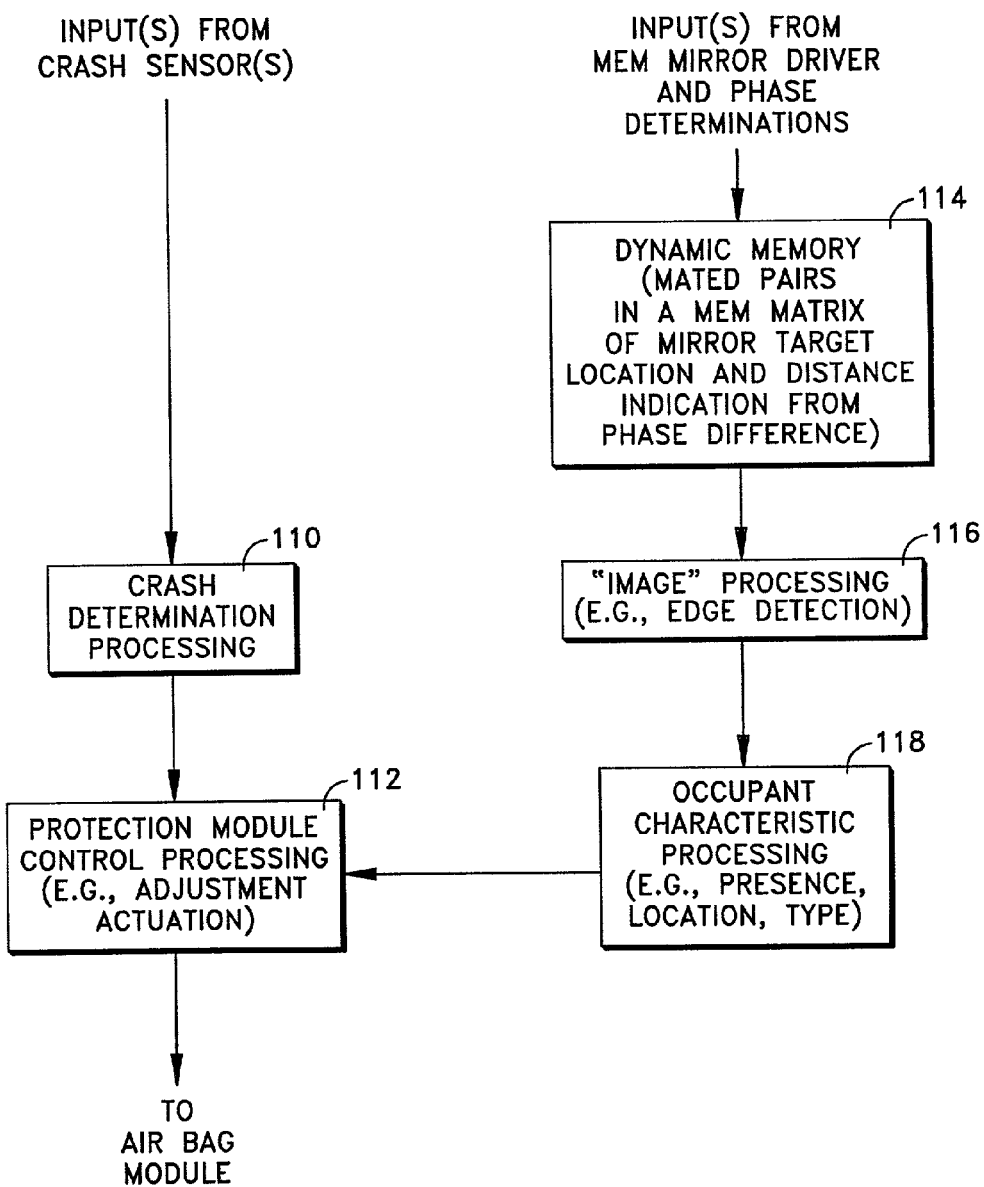
FIG. 3 is a function block diagram for a portion of a controller of the occupant sensor apparatus of FIG. 1.

FIG. 3 provides an example illustration of a block diagram that represents the processing that occurs within the controller 24. It is to be appreciated that the blocks shown in FIG. 3 represent one or more circuits and/or processors performing algorithms that accomplish the discussed functions.

The input from the crash sensor 28 is provided to a crash determination processing component 110. Within the crash determination processing component 110, the sensory information is processed and a determination is made as to whether a vehicle crash condition is occurring. The determination with regard to the occurrence of a vehicle crash condition is provided to a protection module control processing component 112.

Inputs from the movement driver and the phase determination components 50 and 96 are provided to a dynamic memory 114. Within the memory 114, mated pairs of mirror target location and distance indicative information are stored in an M×N matrix. The memory 114 is dynamic in that the memory information is constantly being rewritten as the mirror is continuously scanned.

The information that is stored in the memory 114 may have any suitable form. For example, the stored information may be based upon determined intensity that is indicative of phase difference and thus indicative of distance.

An "image" processing component 116 receives the target location and distance indicative information from the memory 114. It should be recalled that the information is provided in matrix form and that the matrix is related to a scanned area. Thus, an "image" is generated based upon the distance indications for the pixel points that comprise the scanned area. However, it is to be appreciated that the processing that is done is not intended to be a limitation on the present invention. Mere distance determination is a basic form of processing. Still further, more sophisticated processing such as edge detection determination may be done.

An occupant characteristic processing component 118 utilizes the results of the imaging processing to make determinations about one or more occupant characteristics. For example, the determinations may be directed to whether an occupant is present, where the occupant is located, and the type of occupant (e.g., an adult or a child in a child seat). The results of the occupant characteristic processing are provided to the protection module control processing component 112 and utilized therein to control the protection module.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant sensor apparatus comprising:
   beam means for emitting a beam;
   modulation means for modulating the beam;
   scan means for directing the beam toward the occupant in a pattern that moves across a plurality of points on the occupant;
   receiver means for receiving reflection of the beam from the occupant;
   phase determination means for determining phase difference between the emitted beam and the reflection associated with each point on the occupant;
   map means for mapping a contour and location representation of the occupant using the determined phase differences; and
   characteristic determination means for determining at least one occupant characteristic of the occupant using the contour and location representation of the occupant.

2. An apparatus as set forth in claim 1, wherein said beam means comprises an infrared LED.

3. An apparatus as set forth in claim 1, wherein said scan means comprises a microelectronic machine device.

4. An apparatus as set forth in claim 3, wherein said microelectronic machine device comprises a reflective surface component that is movable about two axes relative to a base portion of the microelectronic machine device.

5. An apparatus as set forth in claim 4, wherein the movement of said reflective surface component about a first of the two axes is an oscillation on the order of 3,000 Hz and the movement of said reflective surface component about a second of the two axes is an oscillation on the order of 30 Hz.

6. An apparatus as set forth in claim 1, wherein said modulation means comprising means for modulating the beam at a frequency on the order of 3 MHz.

7. An apparatus as set forth in claim 1, wherein said characteristic determination means comprises distance determination means for determining distance to each point on the occupant using determined phase difference.

8. An apparatus as set forth in claim 1, further comprising means for providing an indication of the determined occupant characteristic to means for determining control of an occupant protection device.

9. A method of vehicle occupant sensing comprising:

emitting a beam;

modulating the beam;

directing the beam toward the occupant in a pattern that moves across a plurality of points on the occupant;

receiving reflection of the beam from the occupant;

determining phase difference between the emitted beam and the reflection associated with each point on the occupant;

mapping a contour and location representation of the occupant using the determined phase differences; and determining at least one occupant characteristic of the occupant using the contour and location representation of the occupant.

* * * * *